United States Patent
Tanaka et al.

(10) Patent No.: US 7,606,323 B2
(45) Date of Patent: Oct. 20, 2009

(54) CARRIER LEAK REDUCTION TRANSMITTER CIRCUIT

(75) Inventors: Satoshi Tanaka, Kokubunji (JP); Yukinori Akamine, Kokubunji (JP)

(73) Assignee: Renesas Technology Corp., Tokyo (JP)

(*) Notice: Subject to any disclaimer, the term of this patent is extended or adjusted under 35 U.S.C. 154(b) by 717 days.

(21) Appl. No.: 11/334,571

(22) Filed: Jan. 19, 2006

(65) Prior Publication Data
US 2006/0189283 A1    Aug. 24, 2006

(30) Foreign Application Priority Data
Feb. 18, 2005 (JP) ............................. 2005-041955

(51) Int. Cl.
*H04K 1/02*    (2006.01)
(52) U.S. Cl. ............... 375/296; 375/295; 455/324; 455/333; 455/127.1; 327/291; 332/106; 341/20; 341/173
(58) Field of Classification Search ............... 375/296, 375/295; 455/324, 333; 327/291; 332/106; 341/20, 173
See application file for complete search history.

(56) References Cited

U.S. PATENT DOCUMENTS 6,122,497 A * 9/2000 Gilbert ................. 455/333
7,356,326 B2 * 4/2008 Kim ..................... 455/324
2003/0095607 A1 * 5/2003 Huang et al. ............ 375/296
2005/0141634 A1 * 6/2005 Lin ..................... 375/295

FOREIGN PATENT DOCUMENTS

JP    2001-223535    8/2001

OTHER PUBLICATIONS

B. Razavi, "RF Transmitter Architectures and Circuits," IEEE 1999 Custom Integrated Circuits Conference, 1999, pp. 197-204.

* cited by examiner

*Primary Examiner*—Shuwang Liu
*Assistant Examiner*—Helene Tayong
(74) *Attorney, Agent, or Firm*—Miles & Stockbridge P.C.

(57) ABSTRACT

A transmitter circuit has two mixers that modulate a carrier wave according to an input signal, outputs a signal having information in a phase and an amplitude, detects a DC offset in each of the mixers, and adds a DC voltage that corrects the detected DC offset to the input signal of the mixers. The mixer is a double balanced mixer having two load resistors, and the transmitter circuit has a resistor that is connected between a node of two load resistors and a power supply, a limiter amplifier that amplifies a signal, and a control unit that changes first and second potentials using a signal that is outputted by the limiter amplifier. The first and second potentials become a potential of the DC voltage that corrects the DC offset.

12 Claims, 17 Drawing Sheets

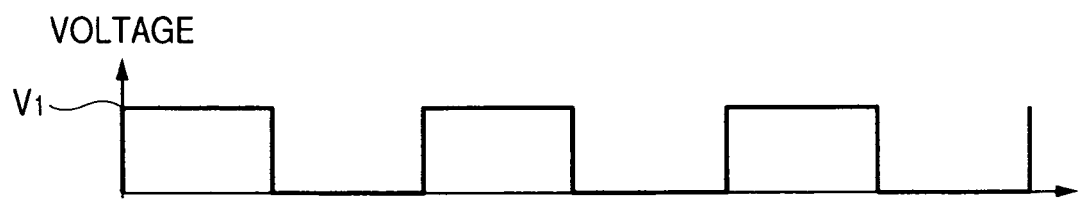
FIG. 2A
FIG. 2B
FIG. 2C
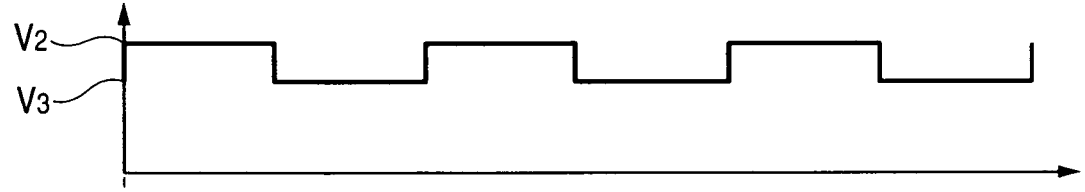
FIG. 2D
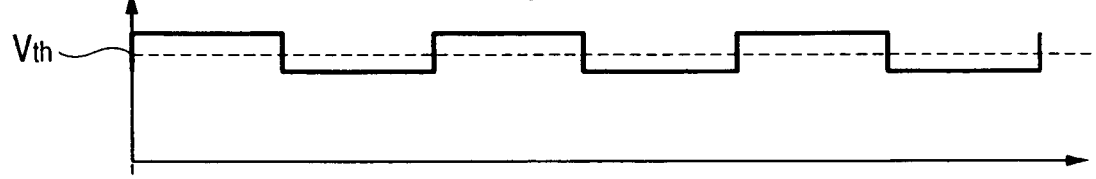
FIG. 2E
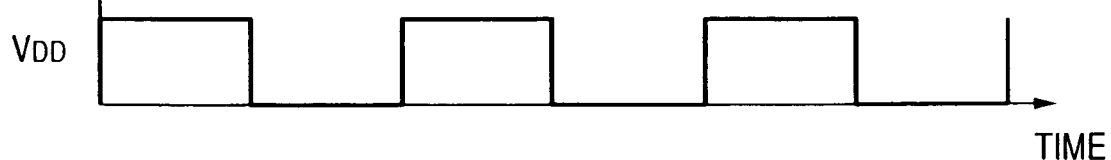

FIG. 8

|  | IN/OUT | Bit | STATE0 | STATE1 | STATE1 |
|---|---|---|---|---|---|
| MODCAL_ON | IN | 1 | 0 | 1 | 1 |
| IQCAL | IN | 1 | – | 1 | 0 |
| CAL_CLK | IN | 1 | – | 0/1 | 0/1 |
| C_SET | IN | 6 | F | SET_IDAC | SET_QDAC |
| DET_RES | OUT | 1 | – | ON | ON |

FIG. 9

|  | STATE1 | STATE2 |
|---|---|---|
| SW1 | ON | ON |
| SWI1 | GND/THRU | GND |
| SWI2 | THRU/GND | GND |
| SWI3 | OFF | ON |
| SWI4 | OFF | ON |
| SWQ1 | GND | GND/THRU |
| SWQ2 | GND | THRU/GND |
| SWQ3 | ON | OFF |
| SWQ4 | ON | OFF |

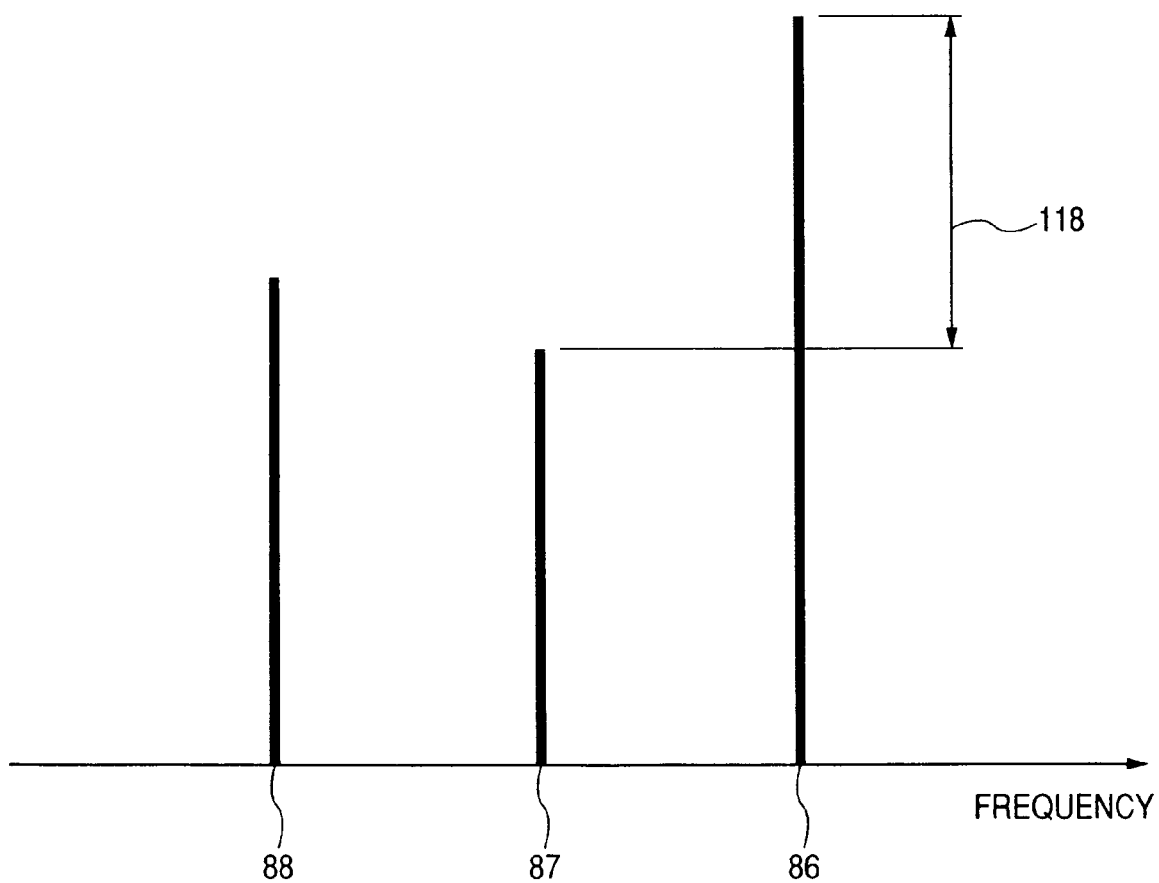

CARRIER LEAK REDUCTION TRANSMITTER CIRCUIT

CLAIM OF PRIORITY

The present application claims priority from Japanese application JP 2005-041955 filed on Feb. 18, 2005, the content of which is hereby incorporated by reference into this application.

FIELD OF THE INVENTION

The present invention relates to a transmitter circuit that suppresses a carrier leak occurring with non-constant envelope modulation by which frequency modulation is conducted.

BACKGROUND OF THE INVENTION

In a mobile communication such as a cellular phone, in the case of applying a transmitting signal with non-constant envelope due to GMSK (Gaussian minimum shift keying) modulation, an offset PLL (phase locked loop) is frequently employed in the transmitter circuit. The offset PLL subjects a voltage control oscillator to modulation to convert a modulation signal into a transmission frequency. The detailed operation of the offset PLL is As disclosed in, for example, (Behzad Razavi), "RF Transmitter Architectures and Circuits)", (U.S.), (IEEE 1999 Custom Integrated Circuits Conference) a draft book, 1999, pp. 197 to 204.

Also, in the case of applying a transmission signal of multi-levels and multi-phases (therefore, non-constant envelope) due to 8-value PSK (phase shift keying) modulation, etc., a double balanced mixer is frequently used in the transmitter circuit. The double balanced mixer is designed in such a manner that two pairs of transistors that turn on or off in response to a carrier signal are used, and the respective currents of those two paired transistors are changed according to a differential modulation signal, for example, as disclosed in JP 2001-223535A.

SUMMARY OF THE INVENTION

In a market of a mobile communication, particularly, a cellular phone, a business focusing on a voice service and an e-mail service has been widely expanded in the world up to now. It is expected that a service that deals with high-speed data such as an image or the internet will be expanded in the future. The GSM that is the highest in the diffusion ratio among the cellular phones is progressively shifted from a system using conventional GMSK modulation that is non-constant envelope modulation to an EDGE (enhanced data for global evolution) system using multi-level modulation, that is, 8-value PSK modulation of the non-constant envelope modulation toward high speed processing. Further, the combined use of the GSM with the W-CDMA (wideband-code division multiple access) that has started to be pervasive through Japan is also now advanced.

In the conventional GSM (constant GMSK modulation), the above-mentioned offset PLL has been employed in the transmitter circuit. The offset PLL is capable of reducing the radiation of unnecessary interfering waves because of the direct modulation of the oscillator.

On the other hand, the offset PLL system cannot be applied to a modulation signal having modulation information in both of the phase and amplitude, which is obtained by the 8-value PSK modulation used in that EDGE or QPSK (quadrature phase shift keying) modulation used in the W-CDMA. As a result, for example, a quadrature modulation transmitter circuit shown in FIG. 18 is required.

The quadrature modulation transmitter circuit is made up of two mixer circuits 82, 83, a two-frequency divider 84, a gain variable amplifier 85, and so on. Also, the above-described double balanced mixers are frequently applied to the respective mixer circuits 82 and 83.

In this case, there arises an issue on the suppression of carrier leak where carrier signals are leaked to the output side in the mixer circuits 82 and 83. FIG. 19 shows a relationship between spurious waves (interfering waves) caused by variations of the mixer circuits and the transmission signals. There are a carrier leak 87 caused by a DC offset of the carrier circuit with respect to the transmission signal 86, and an image signal 88 that is attributable to a phase error of a local oscillation signal that occurs in the two-frequency divider. In those signals, the carrier leak is the most dominant spurious signal. The DC offset is caused by variations of the transistor characteristics and the resistance on an integrated circuit, and naturally exists. In a CMOS (complementary metal oxide semiconductor) that is advanced in recent years, the problem is actualized because the variation of a threshold value of FETs (field effect transistors) on the same chip is large. In particular, a demand specification to a carrier leak ratio 118 which is a power ratio of the transmission signal to the carrier leak is more extreme as the modulation system is higher as with the non-constant amplitude, and there arises a large issue of suppressing the carrier leak.

JP 2001-223535A discloses an inspection method in which the variation of transistors that generate the carrier leak is suppressed by manually adjusting the bias voltage of the transistors. This method cannot cope with a deterioration with time and a change in temperature after factory shipment, and it is difficult to stabilize the carrier leak suppression.

The present invention has been made to solve the above problems, and therefore an object of the present invention is to provide a transmitter circuit having mixers which stably suppress a carrier leak.

In order to achieve the above object, according to the present invention, there is provided a transmitter circuit that is equipped with mixers which modulate a carrier signal according to an input signal and outputs a first signal having information in phase and amplitude, in which a DC offset is detected in each of the mixers, and a DC voltage that corrects the detected DC offset is added to the input signal of the mixer. Since the transmitter circuit has a function of correcting the DC offset that causes the carrier leak, the DC offset can be corrected at the time of operation, for example, every time where a power turns on or transmission is conducted, and therefore the carrier leak is stably suppressed.

Preferably, each of the mixers has a double balanced mixer having two first resistors for differential outputs, and the transmitter circuit further includes a second resistor that is connected between a node of the two first resistors and a power supply, a limiter amplifier that amplifies a second signal that appears at the node when potentials at a pair of input terminals that input the input signals of the differential of the double balanced mixers are alternately set to a first potential and a second potential, and a control unit that changes the first potential and the second potential by using a third signal that is outputted by the limiter amplifier. In the transmitter circuit, a feedback loop that reduces the amplitude of the second signal is formed by changing the first potential and the second potential, and the first potential and the second potential which are converged in the feedback loop are the DC voltage that corrects the DC offset. Also, it is preferable that the transmitter circuit includes an orthogonal modulation circuit using the two mixers structured as described above.

According to the present invention, there is realized the transmitter circuit that stably suppresses the carrier leak because the DC offset that causes the carrier leak at the time of operation can be corrected.

BRIEF DESCRIPTION OF THE DRAWINGS

These and other objects, features and advantages of the present invention will become more apparent upon consideration of the following description of the preferred embodiments of the present invention taken in conjunction with the accompanying drawings.

FIGS. 2A to 2E are waveform diagrams for explaining the operation of the first embodiment;

FIG. 8 is a diagram for explaining the operational state according to the second embodiment of the present invention;

FIG. 9 is a diagram for explaining a state of a switch according to the second embodiment of the present invention;

FIG. 19 is a diagram for explaining a carrier leak.

DETAILED DESCRIPTION OF THE PREFERRED EMBODIMENTS

Figure 1:
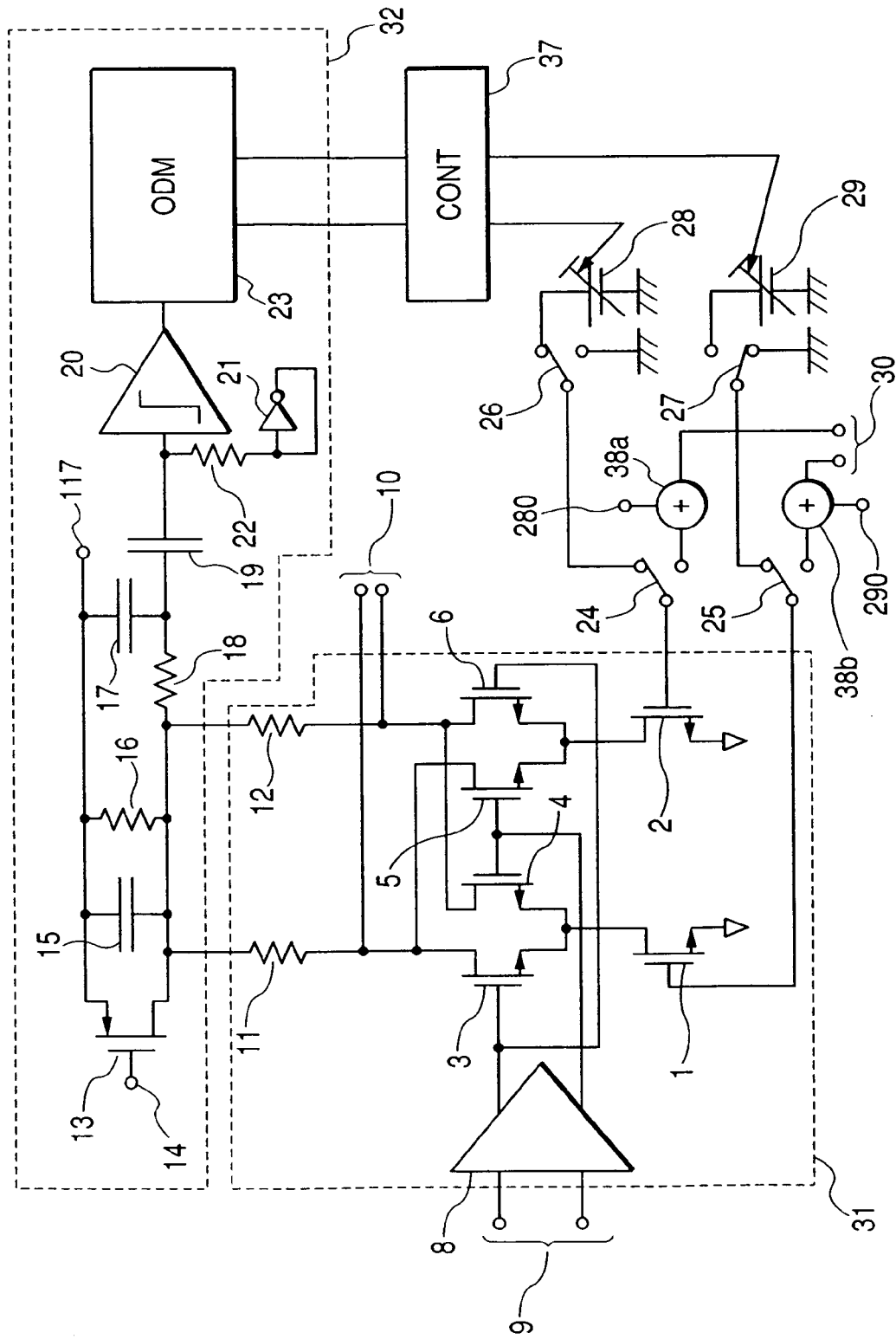
FIG. 1 is a circuit diagram for explaining a transmitter circuit according to a first embodiment of the present invention.

Now, a description will be given in more detail of a carrier leak reduction transmitter circuit according to embodiments of the present invention with reference to the accompanying drawings. In all of the drawings used for description, identical references denote the same or similar parts.

A first embodiment of the present invention will be described with reference to FIGS. 1 to 4. First, the basis structure and operation of the transmitter circuit will be described with reference to FIGS. 1 and 2. A mixer 31 that constitutes a main portion of a transmitter circuit is a double balanced mixer which includes transistors 1 to 6, and load resistors 11, 12 (first resistors). Local signals that are opposite in phase to each other, that is, differential carrier signals are inputted from local signal input terminals 9. The local signals are then amplified by a buffer amplifier 8, and supplied to the transistors 3 to 6 (the first transistors). The transistors 3 to 6 switch on/off according to the differential local signals. The transistors 3 and 4 are paired, and the transistors 5 and 6 are also paired with the result that the transistors 3 to 6 form two pairs of transistors. Since the transistors 3 and 6 have the common input terminal, those transistors turn on/off at the same time. Similarly, since the transistors 4 and 5 have the common input terminal, those transistors turn on/off at the same time. Also, base band input signals that are differential modulation signals are inputted from base band input signal terminals 30, and then supplied to a pair of transistors 1 and 2 (second transistors) through switches 24 and 25. In the above manner, on-state currents of the transistors 3 to 6 that conduct the switching operation become driving currents of the transistors 1 and 2 which change according to the base band input signals, thereby conduct modulation. Transmission signals (first signals) to be differentially modulated are outputted from an output terminal 10 that is connected with load resistors 11 and 12.

A carrier leak is mainly attributable to an error in the driving currents of the transistors 1 and 2 which should be identical with the same input potential, that is, a DC offset. The error is detected as follows: First, a supply voltage is applied to an input terminal of a transistor 13 to turn off the transistor 13. Sequentially, a potential $V_1$ of variable bias supplies 28 and 29 is applied to the transistors 1 and 2 through the switches 24 and 25. In this situation, as shown in FIGS. 2A and 2B, a bias is applied to only one of the transistors 1 and 2, and the other transistor is grounded by means of switches 26 and 27. This operation makes it possible to create two states, that is, a state in which only the transistor 1 is biased and a state in which only the transistor 2 is biased in the mixer 31.

A bias current difference in the respective states can be observed by providing a resistor 16 between a power terminal 117 and a node of resistors 11 and 12 and measuring potential drops (second signal) V2 and V3 shown in FIG. 2C at the resistor 16. In this situation, capacitors 15, 17 and a resistor 18 are disposed in order to prevent a high frequency noise caused by the local signal from being mixed with an observed voltage signal. Those elements 15, 17, and 18 function as a low pass filter that attenuates the high frequency signal. The potential drop at the resistor 16 is inputted to a limiter amplifier 20 through a coupling capacitor 19.

As described above, the DC offset is detected by the resistor 16. The detection of the DC offset may be conducted by detecting a common mode component that appears when balance is lost. From this viewpoint, for example, a difference between voltages developed in the resistor 11 and the resistor 12 in the on-state may be detected instead of the use of the resistor 16.

The potential of the input bias of the limiter amplifier 20 is determined by an inverted amplifier 21 that short-circuits its input and output terminals, and a voltage of that potential is applied to an input terminal of the limiter amplifier 20 through a resistor 22. The limiter amplifier 20 is constituted by cascaded inverted amplifiers, and the same circuit as an inverted amplifier at an initial stage of the limiter amplifier 20 is further used for the inverted amplifier 21 that develops the bias. This structure makes it possible that a bias potential coincides with a threshold value of the limiter amplifier. In this manner, an observed wavelength waveform due to the potential drops $V_2$ and $V_3$ become a waveform (third signal) centered on a threshold value $V_{th}$ shown in FIG. 2D at an input of the initial stage in the limiter amplifier 20.

A waveform that waves between a ground potential and the supply voltage VDD as shown in FIG. 2E is outputted from the limiter amplifier 20. This waveform can be regarded as a logical output, and in two states where any one of the transistors 1 and 2 is operative, one state in which the potential drop is larger is set to "1", and another state in which the potential drop is smaller is set to "0". It is understood that when the transistors 1 and 2 operate in a state of "0, 1, 0, 1", the driving current of the transistor 1 is smaller than that of the transistor 2 whereas when the transistors 1 and 2 operate in a state of "1, 0, 1, 0", the driving current of the transistor 1 is larger than that of the transistor 2. In this way, the signs of the offset (which driving current is larger) can be readily detected. The determination is conducted by an offset determination circuit (ODM) 23. Elements between the transistor 13 and the offset determination circuit (ODM) 23 constitute an offset detector circuit 32.

A control unit (CONT) 37 that has received the offset determination result increases and decreases a potential (first potential) of the variable bias supply 28 and a potential (second potential) of the variable bias supply 29 and repeats the above observation, thereby making it possible to correct the offset. That is, a feedback loop is formed by a loop that makes a circuit of the offset detector circuit 32, the control unit 37, and the variable power supplies 28, 29 from the input terminals of the transistors 1 and 2. With this structure, voltages of the variable power supplies 28 and 29 are fed back to the input terminals of the transistors 1 and 2. The feedback loop is a negative feedback, and the operation of the control unit 37 makes the amplitude of the signal (second signal) attributable to the voltage drop which appears in the resistor 16 converge on zero. The offset correction is finished with the convergence. A bias voltage (DC voltage that corrects the DC offset) obtained when the offset correction has been finished is applied to bias terminals 280 and 290, and then added to the respective differential base band input signals that are inputted to the input signal terminal 30 by adders 38a and 38b. Simultaneously, an input terminal 14 of the transistor 13 is grounded, the transistor is in a short-circuiting state (on state), and both ends of the resistor 16 are short-circuited. In this state, the mixer 31 conducts the modulation operation in a state where the carrier leak is suppressed to the minimum, and outputs a transmission signal whose carrier leak is reduced to the output terminal 10.

It is needless to say that although FETs are applied to the transistors 1 to 6 of the mixer circuit 31 in FIG. 1, the same function is obtained even if bipolar transistors are applied to those transistors 1 to 6.

Figure 3:
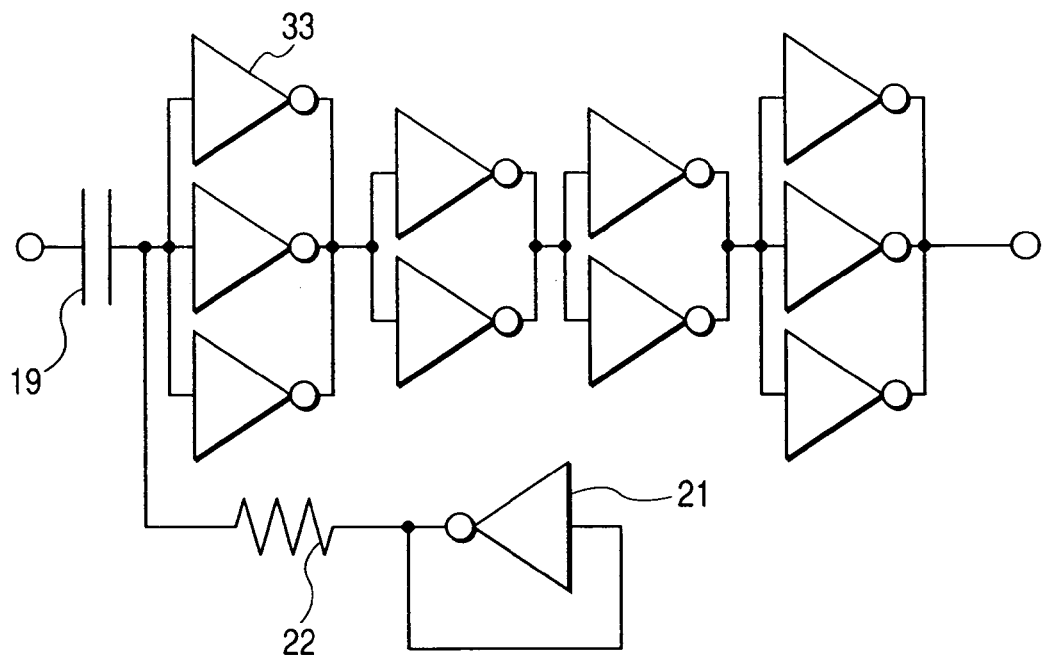
FIG. 3 is a circuit diagram for explaining one example of a limiter amplifier used in the first embodiment.
Figure 4:
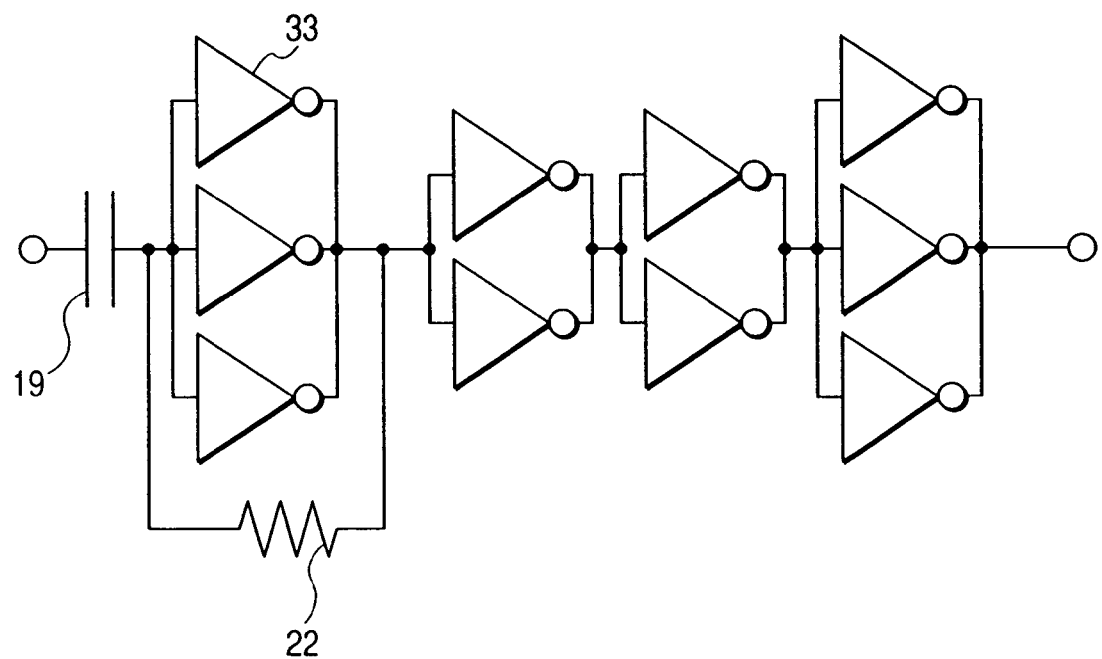
FIG. 4 is a circuit diagram for explaining another example of the limiter amplifier used in the first embodiment.

FIGS. 3 and 4 show the structures of the limiter amplifier 20 preferable to this embodiment. The limiter amplifier 20 shown in FIG. 3 uses CMOS inverter circuits 33 for each of the cascaded inverted amplifiers and the inverted amplifier 21. The output can be readily set to a CMOS logical level. The limiter amplifier 20 shown in FIG. 4 constitutes the bias generator circuit by an amplifier at an initial stage. A resistor (third resistor) 22 is connected between an input terminal and an output terminal at the initial stage. In FIG. 3, because the bias generator circuit is separately disposed, there is a case in which the bias potential does not coincide with a threshold value of the amplifier. As a result, a dead region may occur in the amplifier. The circuit structure of FIG. 4 improves the above drawback.

A second embodiment of the present invention will be described with reference to FIGS. 5 to 13. In this embodiment, the transmitter circuit of the first embodiment is applied to an orthogonal modulator circuit as another transmitter circuit.

Figure 5:
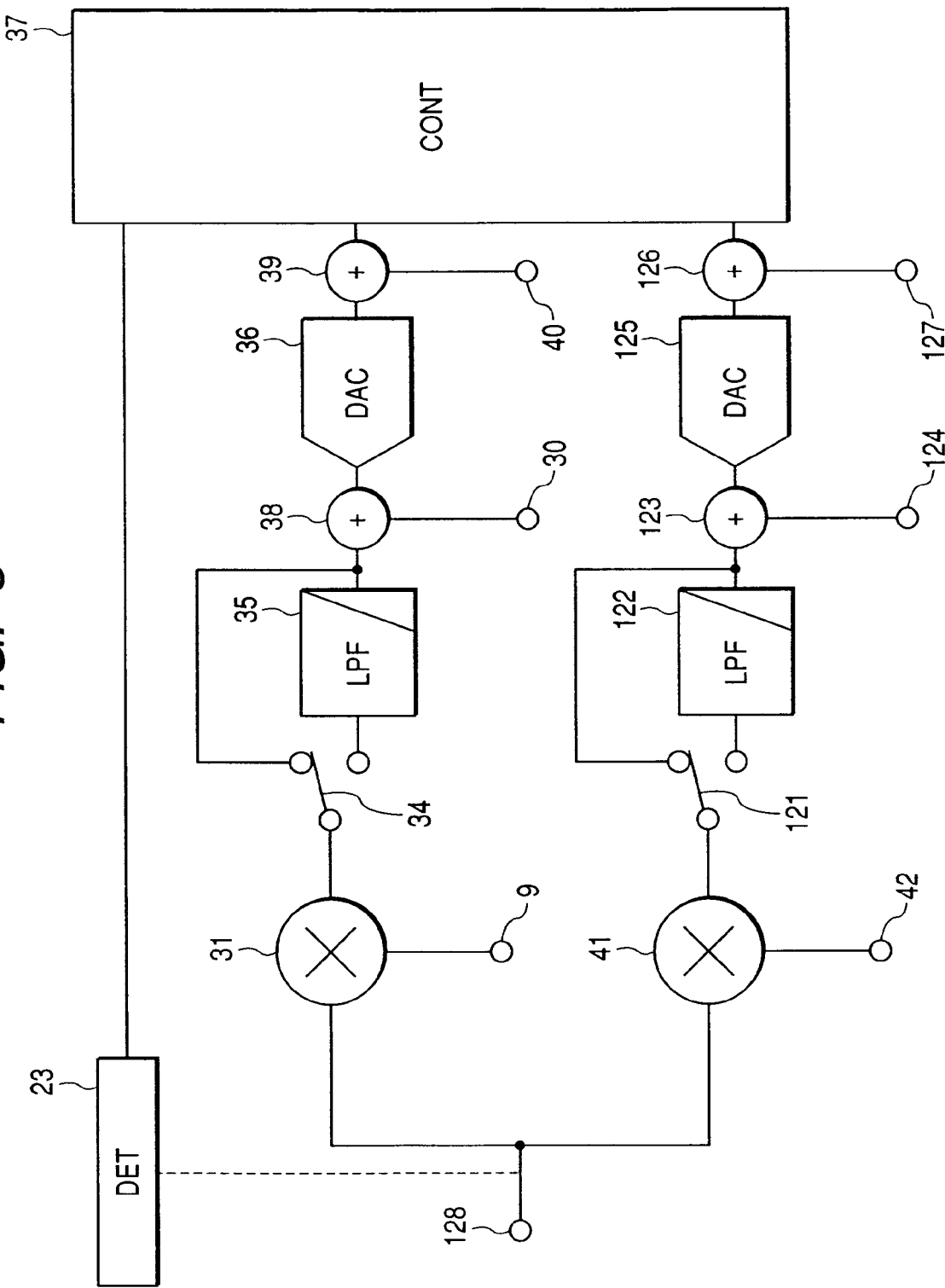
FIG. 5 is a structural diagram for explaining a second embodiment of the present invention.

In the orthogonal modulator circuit, there are disposed two systems of I and Q each using a mixer. Referring to FIG. 5, the I system includes a high-frequency noise suppression filter circuit 35, a switch 34 for separating the filter at the time of correction, an offset detector circuit 23, a control unit 37 that determines the correction potential on the basis of an output of the offset detector circuit 23, and a DA (digital to analog) converter 36 that converts the control result into an analog quantity. A local signal (carrier wave) for the I system is inputted to a local signal input terminal 9. The Q system is made up of a mixer 41 having a local signal input terminal 42, a filter circuit 122, a switch 121, and a DA converter 125, which are the same units as those of the I system, The offset detector circuit 23 and the control unit 37 are shared by the I system and the Q system. The output signals of the mixers 31 and 41 are added together, and a wave to be orthogonally modulated is outputted from an output terminal 128. A local signal for the Q system which is different in phase from that for the I system by 90 degrees is inputted to the local signal input terminal 42.

In the case where the base band input signal of the input terminal 30 is an analog value, the bias voltage that has been corrected is the base band input terminal in the adder 38 that is connected to the output of the DA converter. Also, in the case where the base band input signal is a digital value, a digital base band input signal is inputted to a digital conversion input terminal 40, and a digital bias voltage that has been corrected is added to the digital base band input signal in a digital region by the adder 39. Similarly, in the case where a base band input signal of an input terminal 124 is an analog signal, the bias voltage that has been corrected is added to the base band input signal in the adder 123 that is connected to the output of the DA converter 125. Also, in the case where the base band input signal is a digital value, the digital base band input signal is inputted to a digital conversion input terminal 127, and the digital bias voltage that has been corrected is added to the digital base band input signal in the digital region by the adder 126.

Figure 6:
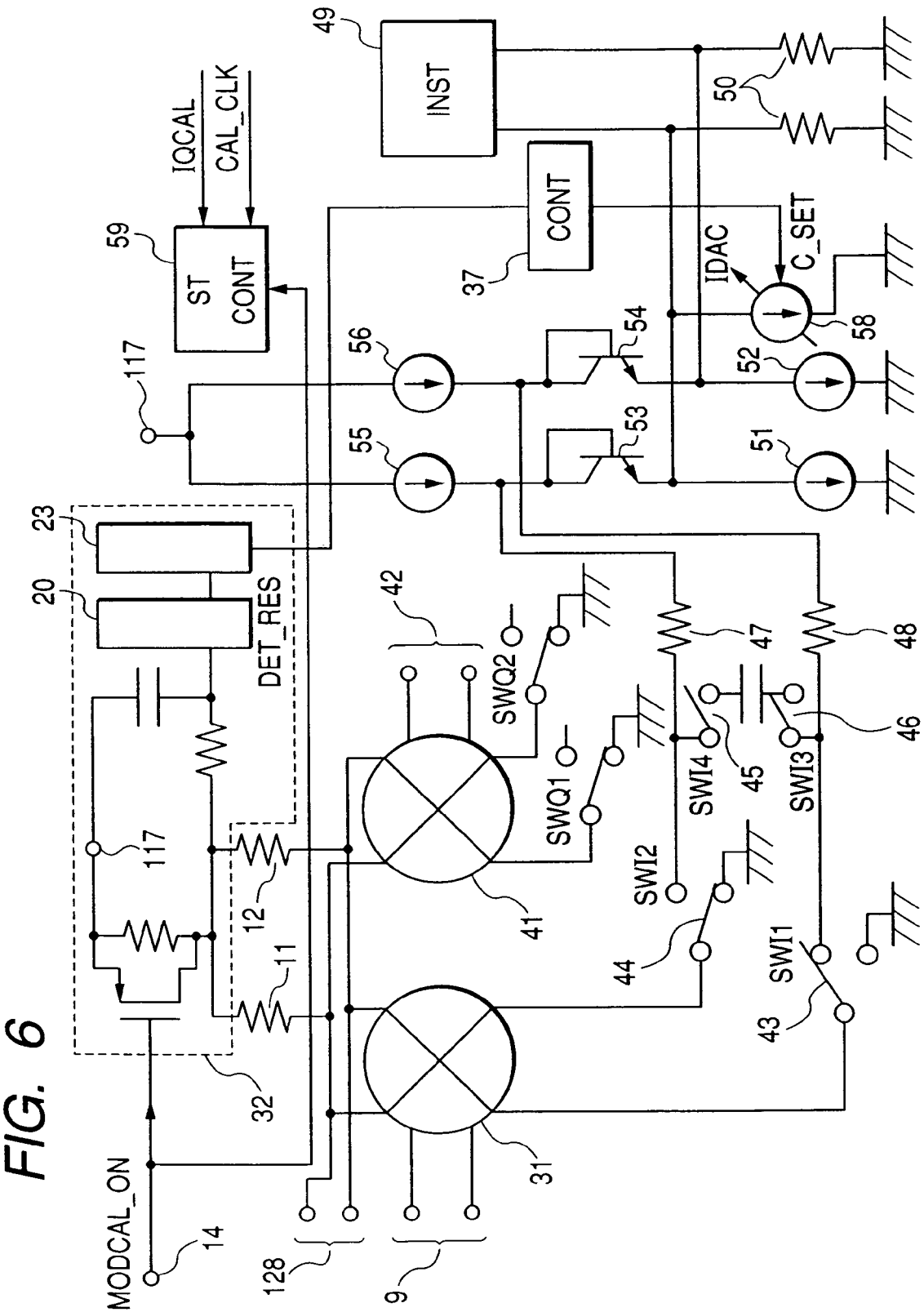
FIG. 6 is a circuit diagram for explaining the second embodiment of the present invention.

FIG. 6 shows a specific circuit of the transmitter circuit according to this embodiment. A mixer 41 for the Q system and a local signal input terminal 42 for the Q system are added in two systems of I and Q, and the load resistors 11 and 12 are shared by the mixers 31 and 41 to add the output signal. In this example, the details will be described focusing on the I system.

Switches 43 and 44 (SWI1 and SWI2; SWQ1 and SWQ2 in the Q system) that change over between grounding and connection to the bias state are connected to the inputs of the mixers 31 and 41. Also, a filter that is made up of resistors 47, 48, and a capacitor (filter 35 in FIG. 5) is selectively connected or disconnected by switches 45 and 46 (SWI3 and SWI4; SWQ3 and SWQ4 not shown in the Q system) which function as the switch 34. The inputted analog base band input signal is converted into a current by an input stage circuit (INST) 49 to drive a load resistor 50. Transistors 53 and 54 that are diode-connected are driven by constant current sources 51, 52, 55, and 56, and a potential that occurs in the load resistor 50 is shifted in level. As a result, a potential occurs in the mixer 31. A bias change amount is determined by the control unit 37 on the basis of a detected output (DET_RES) of the detector circuit 32, and an offset is added to the bias current to adjust an input DC potential of the mixer 31 by a current DA converter (IDAC) 58 for the I system. A multi-bit control signal (C_SET) is inputted to the current DA converter 58 from the control unit 37. The on/off operation in detection is controlled by a transition state control unit (ST-CONT) 59. An instruction signal (IQCAL) for selecting I or Q, and a clock signal (CAL_CLK) are inputted to the transition state control unit 59. Also, a signal (MODCAL_ON) that instructs the execution of the offset detection is inputted to the input terminal 14. As described above, the offset detection using the resistor 16 is conducted when the signal (MODCAL_ON) is a supply voltage. The signal (MODCAL_ON) is also supplied to the transition state control unit 59 at the same time, and the operation of the transition state control unit 59 is controlled.

Figure 7:
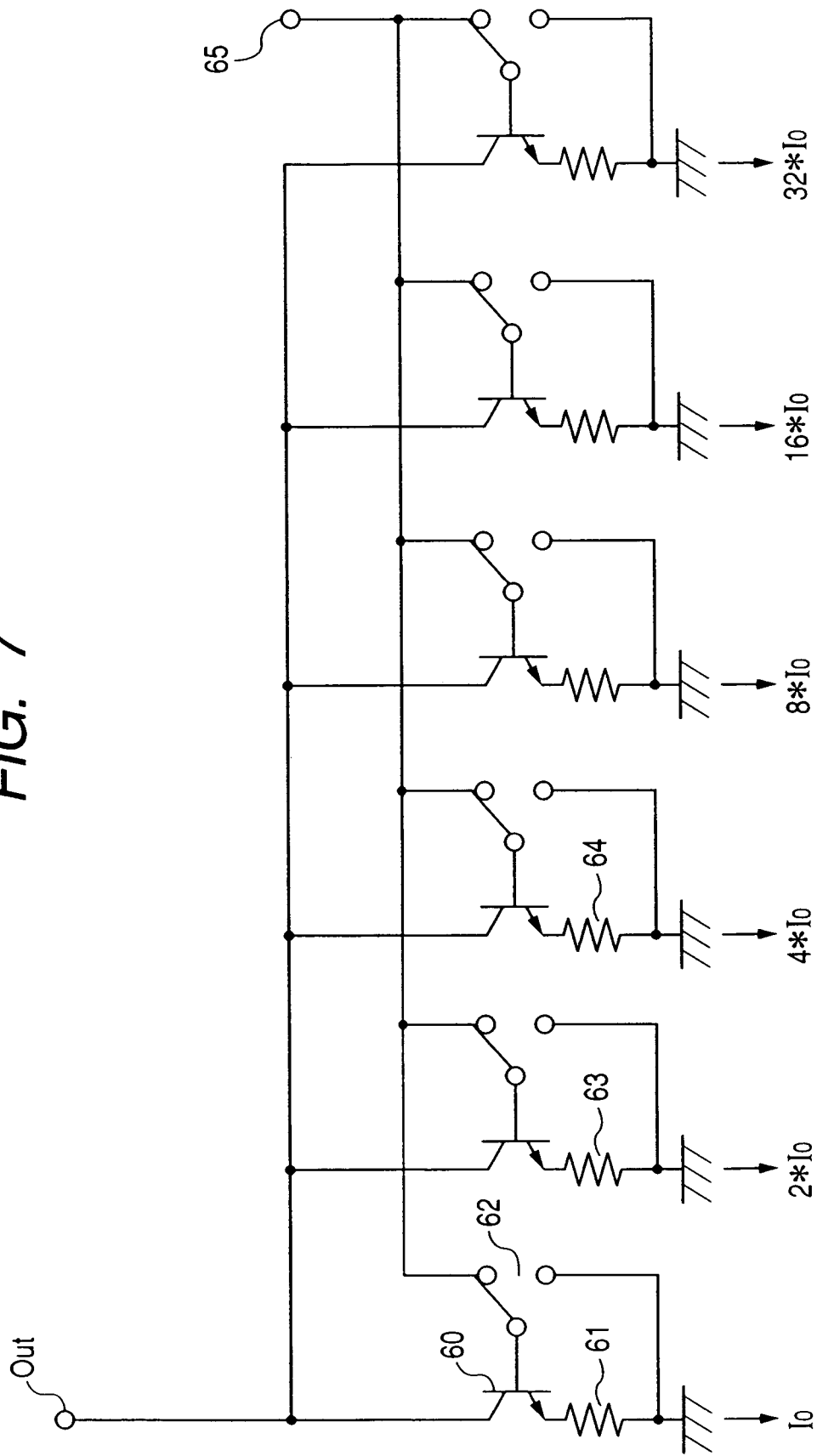
FIG. 7 is a circuit diagram for explaining an example of a DA converter used in the second embodiment.

FIG. 7 shows the detail of the current DA converter 58. A switch 62 that operates according to a control signal (C_SET) is connected to a current source circuit that is made up of a transistor 60 to which a constant voltage is applied from a terminal Out, and a resistor 61. The switch 62 changes over between a reference potential attributable to a bias voltage from a terminal 65 and a ground potential with respect to an input terminal of the transistor 60. With this structure, the presence/absence of a current value $I_o$ that flows in a terminal Out is controlled. Sequentially, resistances are lessened in order of a resistor 63 that is ½ times in resistance and a resistor 64 that is ¼ times in resistance to obtain a current value $2*I_o$, a current value $4*I_o$, a current value $8*I_o$, a current value $16*I_o$, and a current value $32*I_o$. As a result, a multi-bit DA converter can be structured.

FIG. 8 systematically shows an input/output relationship (IN/OUT), the number of bits (Bit), an operating state as the mixer (STATE0), a detection state of the I system (STATE1), and a detection state of the Q system (STATE2) with respect to the above-mentioned control related signals, respectively. F in STATE0 represents a final value when the offset detection is completed.

Also, FIG. 9 shows on (ON), off (OFF), ground (GND), and connection (THRU) in the STATE1 state and the STATE2 state of the respective switches.

Figure 10:
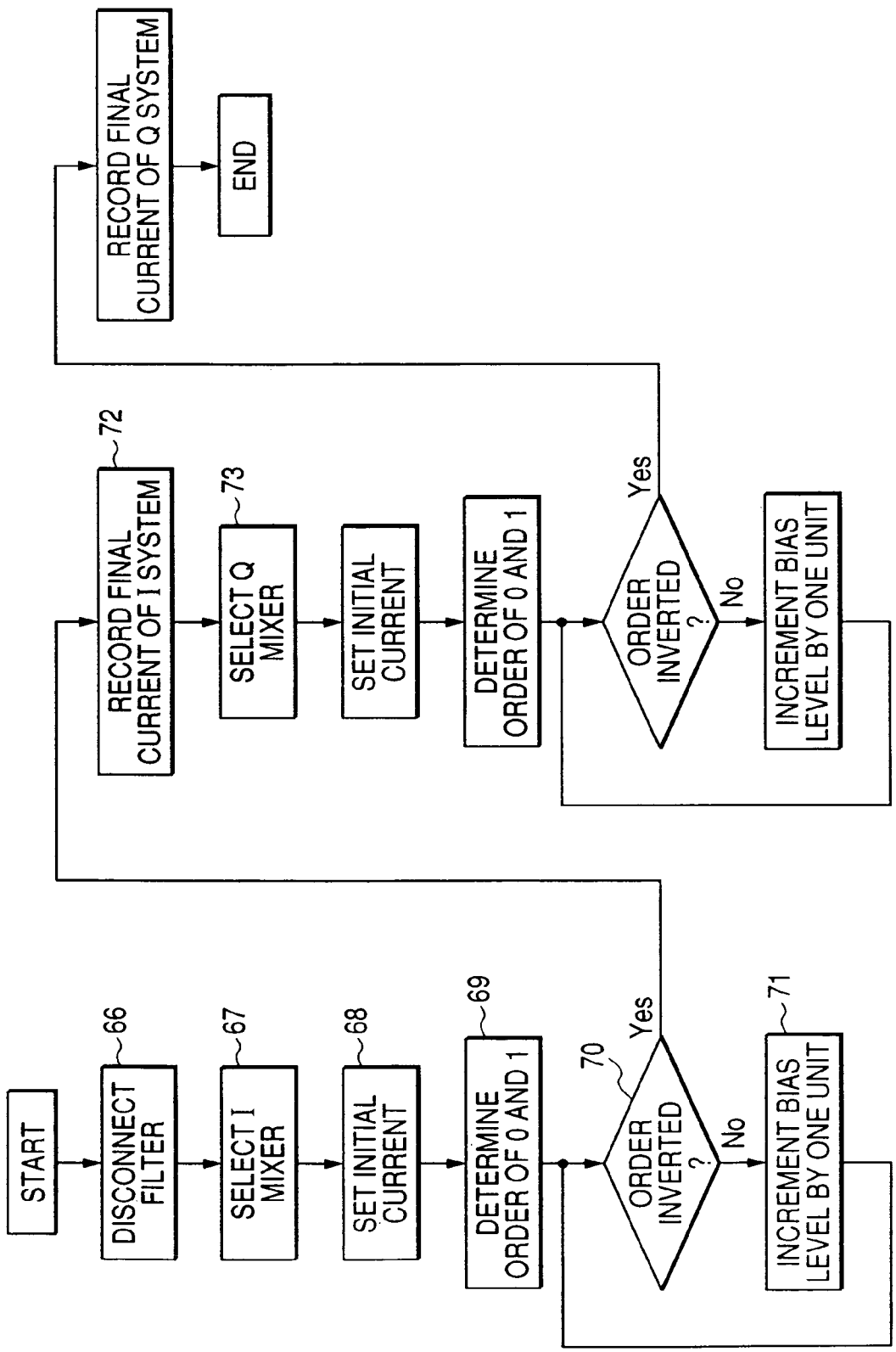
FIG. 10 is a flowchart for explaining one operational sequence according to the second embodiment.

FIG. 10 shows an operating sequence of this embodiment. The filter 35 is separated in Step S66, and the mixer 31 of the I system is selected in Step S67. The input bias potential of the mixer 31 is set to an initial potential in Step S68. An output data string is checked in the detector circuit 32 in Step 69, and it is judged in Step S70 whether the order of 0 and 1 is inverted to 1 and 0, or not. If not inverted, one of the bias levels increments by one unit in Step S71, and Steps 70 and 71 are repeated until the judgment in Step S70 is true. Thereafter, a current is recorded at the time of inversion in Step S72. Sequentially, the mixer 41 of the Q system is selected in Step S73. Subsequently, the same sequence as that in the I system is repeated to complete the correction.

Figure 11:
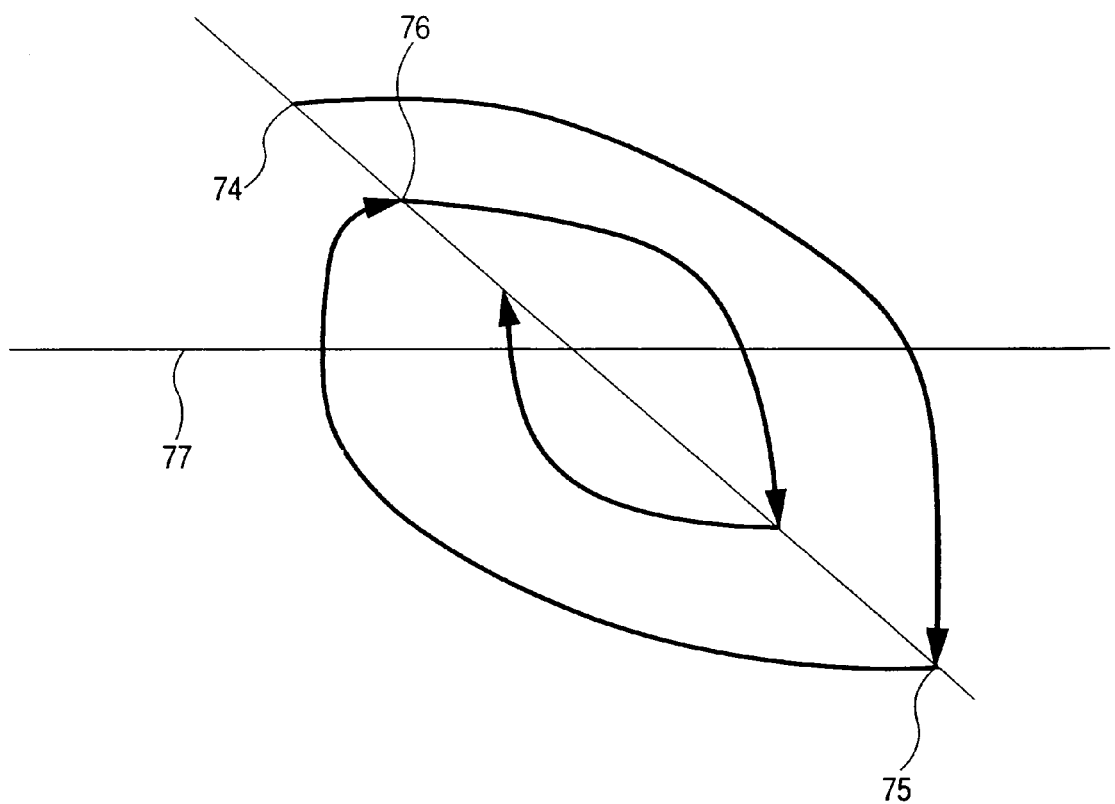
FIG. 11 is a diagram for explaining another operational sequence according to the second embodiment.

There is proposed a pincer method shown in FIG. 11 as another correcting process. In this method, a sign of the initial state is determined (74), the most significant bit (most bit current source of the DA converter) is then inverted, the order of the bits is sequentially lowered and executed (76), and the DA converter output when the sign inversion stops (77) is recorded. This method can shorten a convergence period of time.

Figure 12A:
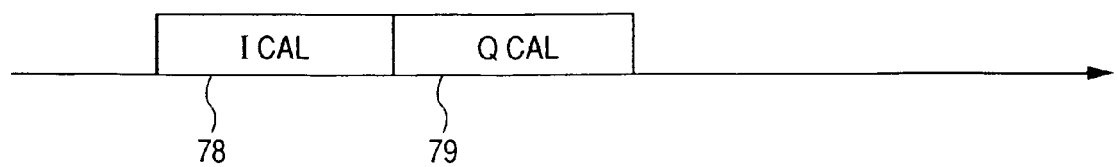
FIG. 12A is a diagram for explaining one operational timing according to the second embodiment.
Figure 12B:
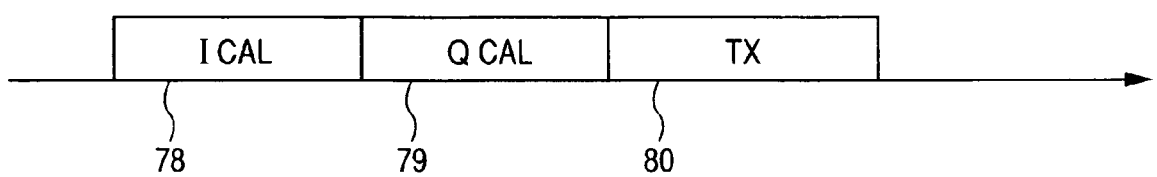
FIG. 12B is a diagram for explaining another operation timing according to the second embodiment.
Figure 12C:
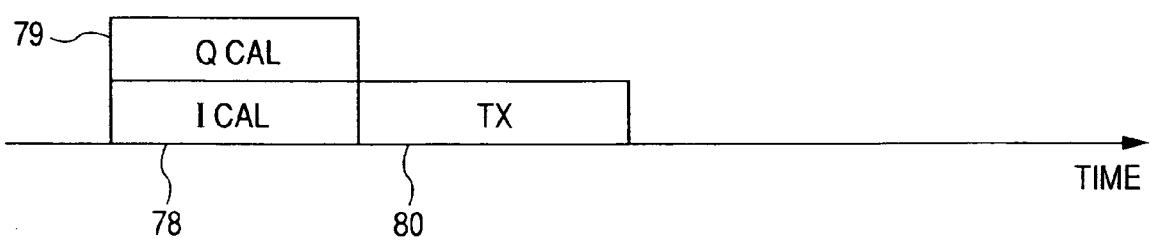
FIG. 12C is a diagram for explaining another operational timing according to the second embodiment.
Figure 13:
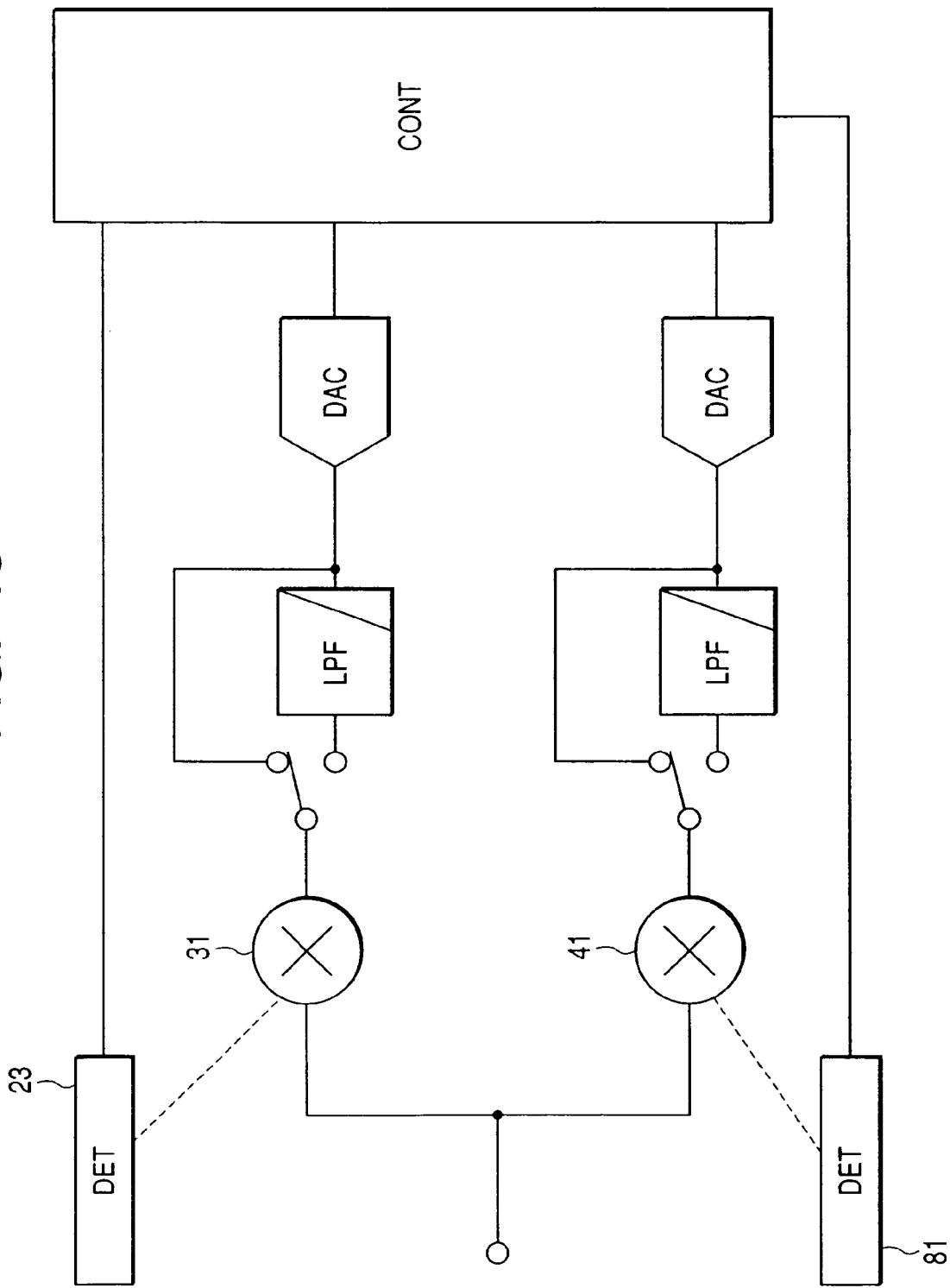
FIG. 13 is a structural diagram for explaining an example that realizes the operational timing shown in FIG. 12C.

In the correction of the two systems of I and Q, there is a basic method shown in FIG. 12A in which an instruction signal (ICAL) and an instruction signal (QCAL) are outputted after a power turns on, and corrections are alternately conducted as shown in FIGS. 12A to 12C. In the case where there is an influence such as a temperature characteristic, there is another method shown in FIG. 12B in which I and Q are alternately corrected immediately each time before transmission (TX). In this case, there can be applied a method of FIG. 12C in which I and Q are corrected in parallel. In this case, detectors of two systems 23 and 81 are required as shown in FIG. 13.

The state shown in FIG. 9, the procedures shown in FIGS. 10 and 11, and the correcting order shown in FIGS. 12A to 12C are executed by program through the control unit 37. The control unit 37 is so structured as to execute the procedure determined as described above.

Figure 14:
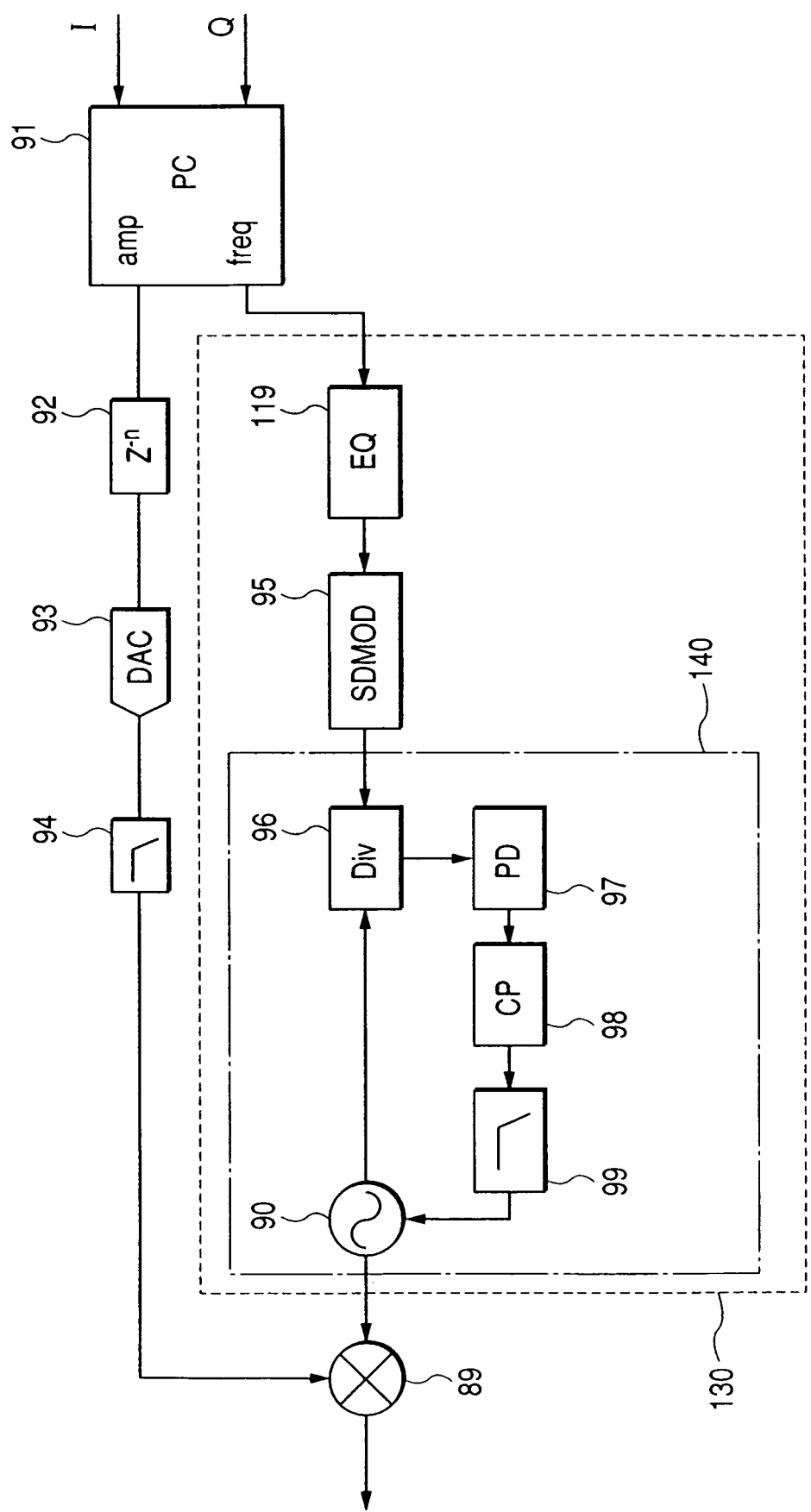
FIG. 14 is a structural diagram for explaining a third embodiment of the present invention.

A third embodiment of the present invention will be described with reference to FIGS. 14 and 15. This embodiment is directed to a transmitter circuit that conducts non-constant envelope modulation in which an output signal of a sigma/delta transmitter is supplied to the local signal input terminal 9 (FIG. 1) of the mixer 31 according to the first embodiment. The I and Q signals that are transmitting base band signals are converted into polar coordinates by a polar coordinate converter unit (PC) 91, and then outputted as the phase information (freq) of digital and the amplitude signal (amp) of digital. The phase information is inputted to the sigma/delta transmitter 130, and the amplitude signal is inputted to the base band input terminal 30 (FIG. 1) of the transmitter circuit 89 centering on the mixer 31 through a delay unit 92, a DA (digital to analog) converter 93, and a filter 94.

The sigma/delta transmitter 130 includes an equalizer (EQ) 119, a sigma/delta modulator (SDMOD) 95, and a phase lock loop (PLL) 140. Also, the phase lock loop 140 includes a voltage control oscillator 90, a frequency divider (Div) 96, a phase comparator (PD), a charge pump circuit (CP) 98, and a filter 99. The phase information is subjected to sigma/delta modulation by the sigma/delta modulator 95, a frequency ratio of the phase lock loop 140 is determined according to the output signal of the sigma/delta modulator 95, and a constant envelope oscillation signal is outputted from the voltage control oscillator 90 according to the phase information.

In the transmitter circuit 89, the constant envelope oscillation signal that is outputted by the voltage control oscillator 90 is modulated according to the amplitude signal that is outputted by the filter 94, and an RF (radio frequency) transmission signal of non-constant envelope modulation is outputted from the output terminal 10 (FIG. 1). As described above, the transmitter circuit 89 of this embodiment makes it possible to conduct transmission with non-constant envelope modulation that is high in precision since the carrier leak is suppressed.

Figure 15:
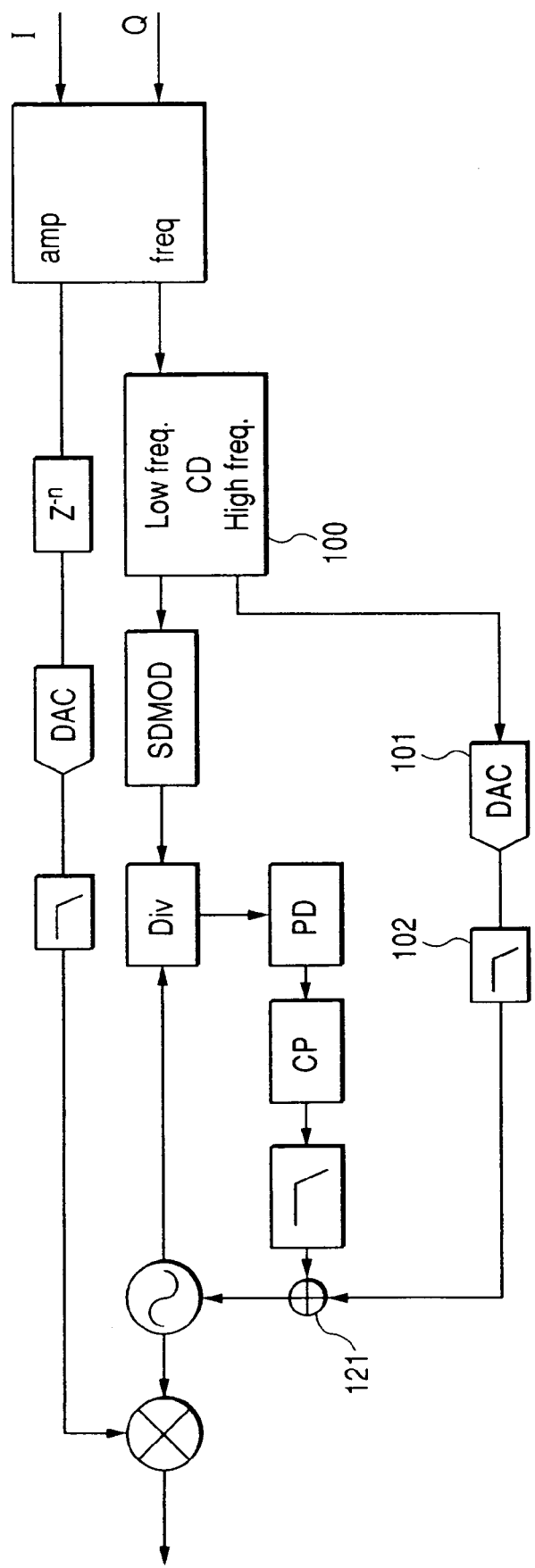
FIG. 15 is a structural diagram for explaining another example according to the third embodiment of the present invention.

As shown in FIG. 15, the phase information is divided into a lower frequency component (Low freq) and a higher frequency component (High freq) by a branching filter (CD) 100. The lower frequency component is subjected to sigma/delta modulation, and the high frequency component is converted into an analog signal by the DA converter 93, and can be then added to the phase lock loop 140 by the adder 121 through a filter 102. The above transmitter circuit can deal with the broad band of the base band signal.

Figure 16:
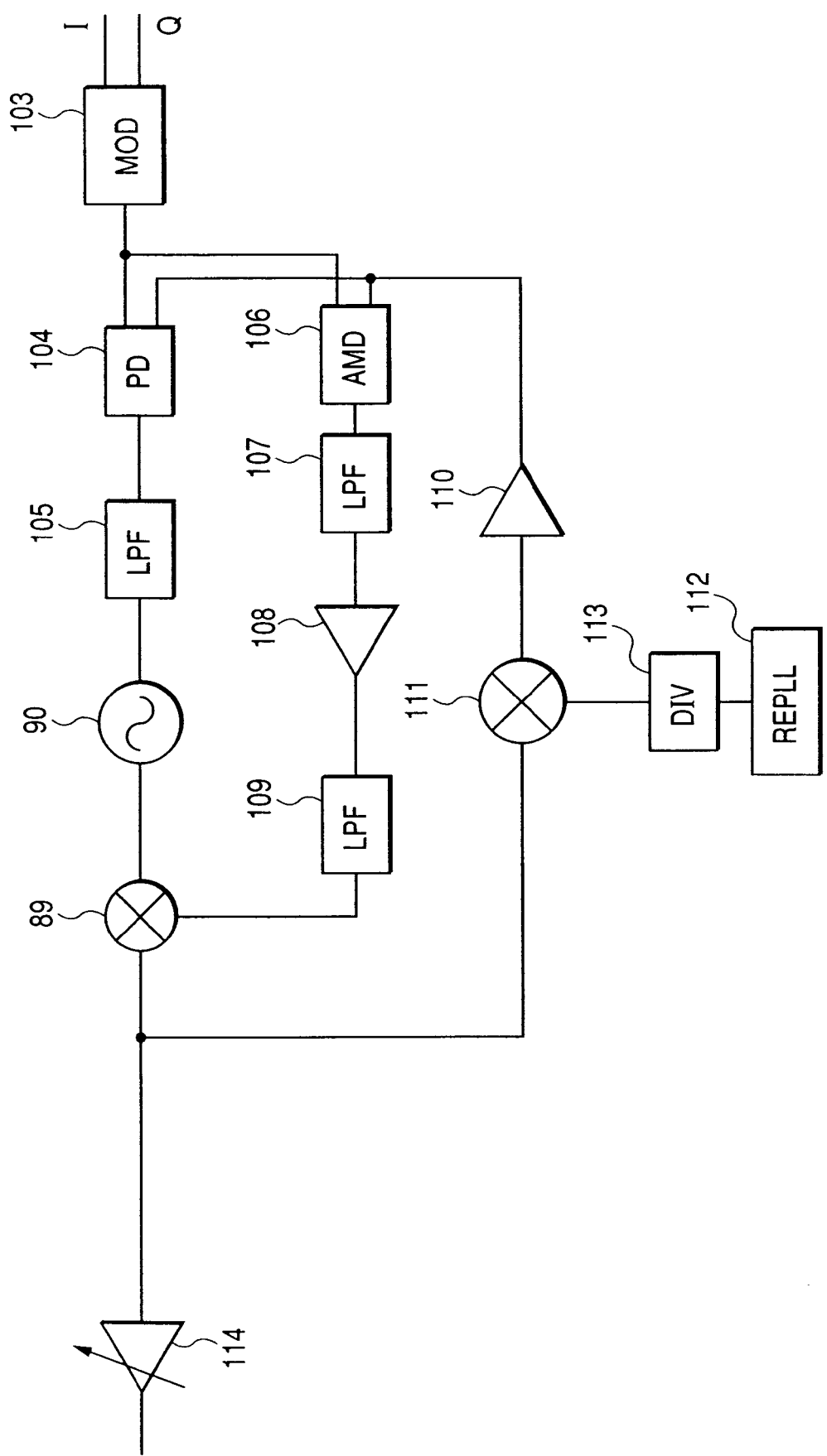
FIG. 16 is a structural diagram for explaining a fourth embodiment of the present invention.

A fourth embodiment of the present invention will be described with reference to FIGS. 16 and 17. This embodiment is directed to a transmitter circuit that conducts non-constant envelope modulation in which an output signal of the offset PLL transmitter is supplied to the local signal input terminal 9 (FIG. 1) of the mixer 31 according to the first embodiment. The I and Q signals are converted into IF (intermediate frequency) signals that are orthogonal to each other by an orthogonal converter unit 103.

A phase difference of the IF signal compared with the feedback signal, which has been detected by the phase comparator (PD) 104 is supplied to the voltage control oscillator 90 through a low pass filter (LPF) 105. The voltage control oscillator 90 outputs an oscillation signal of the constant envelope corresponding to the phase difference. On the other hand, the amplitude difference of the envelope curve of the IF signal compared with the feedback signal which has been detected by an envelope comparator 106 is inputted to the base band input terminal 30 (FIG. 1) of the transmitter circuit 89 centering on the mixer 31 through a low pass filter 107, an amplifier 108, and a low pass filter 109.

In the transmitter circuit 89, an oscillation signal of the constant envelope which is outputted by the voltage control oscillator 90 is modulated according to the amplitude signal that is outputted by the filter 94, and the RF (radio frequency) transmission signal of non-constant envelope modulation is outputted from the output terminal 10 (FIG. 1). The RF transmission signal is converted in frequency by a mixer 111 into a feedback signal of the IF band. The feedback signal is supplied to the phase comparator 104 and the envelope comparator 106 through the amplifier 110. A local signal that has been generated by an RFPLL 112 and divided by a frequency divider 113 is supplied to the mixer 111. Since the feedback signal is supplied to the phase comparator 104 and the envelope comparator 106, a feedback loop is formed. The feedback loop operates so that the phase difference and the amplitude difference approach zero. The RF transmission signal becomes a non-constant envelope signal that makes the phase and the amplitude of the envelope follow the IF signal. The RF transmission signal is inputted to a power amplifier 114 whose gain is controlled, and becomes a transmission signal to an antenna not shown.

Since the carrier leak is suppressed in the transmitter circuit 89 according to this embodiment, it is possible to conduct transmission with non-constant envelope modulation that is high in precision.

Figure 17:
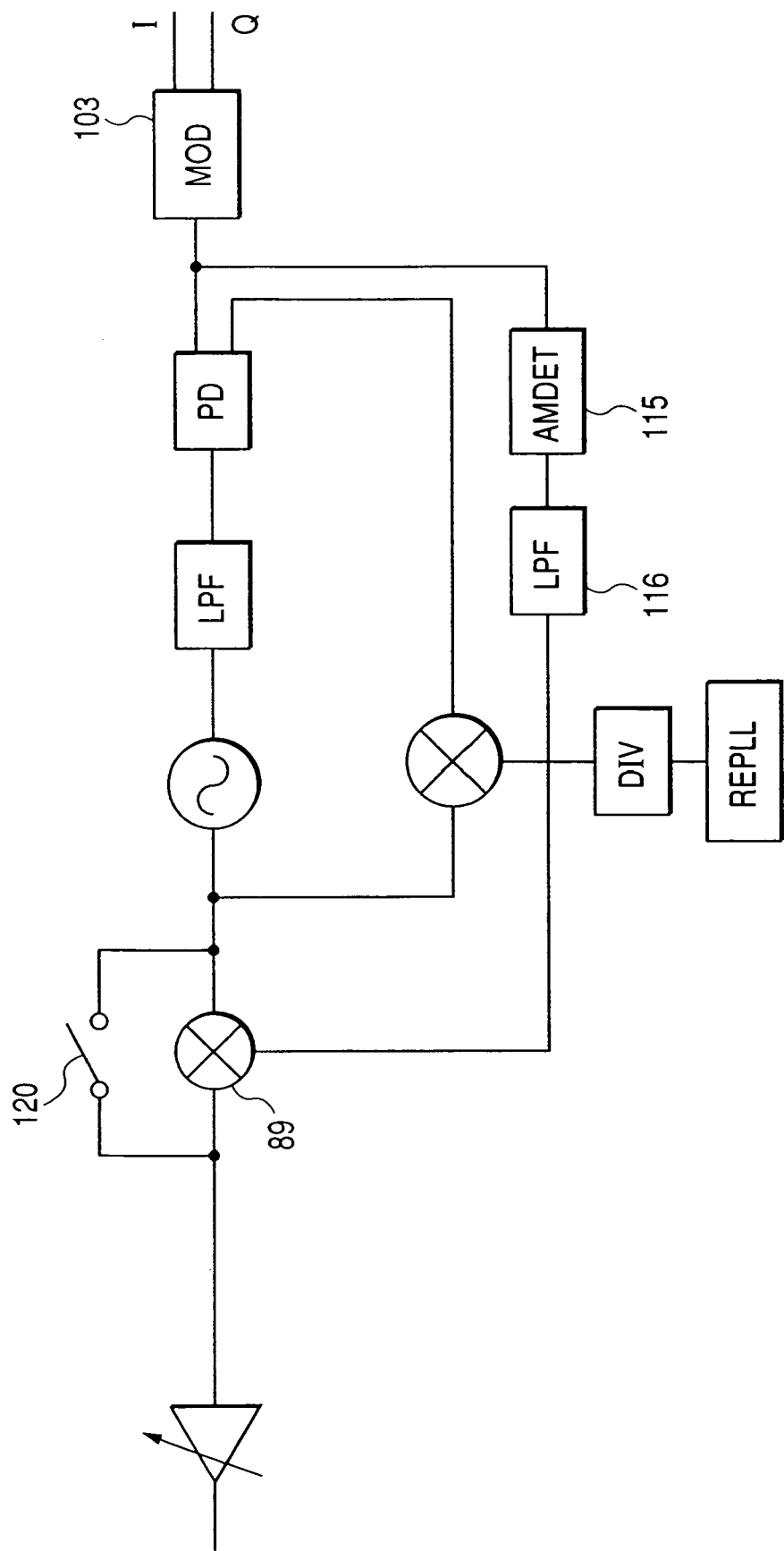
FIG. 17 is a structural diagram for explaining another example according to the fourth embodiment of the present invention.
Figure 18:
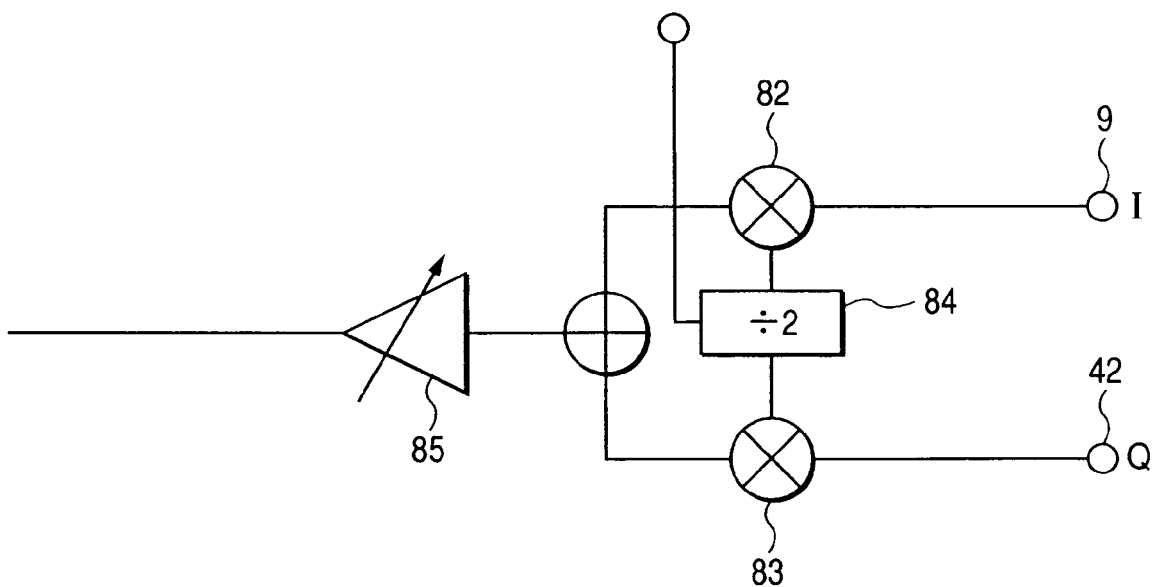
FIG. 18 is a structural diagram for explaining an example of a conventional orthogonal modulator circuit.

As shown in FIG. 17, it is possible to supply the envelope component of the IF signal directly to the base band input terminal 30 of the transmitter circuit 89 without forming a feedback loop with respect to the envelope of the IF signal. The envelope component of the IF signal is extracted from the envelope detector (AMDET) 115, and the envelope component is supplied to the transmitter circuit 89 through a low pass filter 116. Since no feedback loop is formed with respect to the envelope of the IF signal, although a precision in the envelope is lowered than the above structure, the circuit structure is simplified. Also, in the case where the IF signal is a constant amplitude having no envelop component, this embodiment may operate only as the offset PLL, and in this case, the switch 120 is closed to short-circuit the transmitter circuit 89.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A transmitter circuit that outputs a first signal having information in a phase and an amplitude, the transmitter circuit comprising:
a mixer that modulates a carrier signal according to an input signal;
a detector that detects a DC offset of the mixer; and
an adder that adds a DC voltage which corrects the detected DC offset to the input signal of the mixer,
wherein the mixer comprises a double balanced mixer that includes two first resistors for differential output,
wherein the transmitter circuit further comprises:
a second resistor that is connected between a node of the two first resistors and a power supply;
a limiter amplifier that amplifies a second signal that appears at the node when potentials of a pair of input terminals that input differential input signals of the double balanced mixer are alternately set to a first potential and a second potential; and
a control unit that changes the first potential and the second potential by using a third signal that is outputted by the limiter amplifier,
wherein a feedback loop that reduces the amplitude of the second signal by changing the first potential and the second potential, and
wherein the first potential and the second potential which are converged in the feedback loop is a potential of the DC voltage which corrects the DC offset.

2. The transmitter circuit according to claim 1,
wherein the limiter amplifier includes a plurality of cascaded inverted amplifiers.

3. The transmitter circuit according to claim 2,
wherein a third resistor is connected between an input terminal and an output terminal of an initial inverted amplifier among the plurality of inverted amplifiers.

4. The transmitter circuit according to claim 1,
wherein the control unit is structured so that the DC voltage that corrects the DC offset is obtained by correcting one mixer and then correcting another mixer at the time of turning on a power supply.

5. The transmitter circuit according to claim 1,
wherein the control unit is structured so that the DC voltage that corrects the DC offset is obtained by correcting one mixer and then correcting another mixer before transmission.

6. The transmitter circuit according to claim 1,
wherein the control unit is structured so that the DC voltage that corrects the DC offset is obtained by correcting one mixer and another mixer in parallel before transmission.

7. The transmitter circuit according to claim 1,
wherein the double balanced mixer includes two pairs of first transistors that conduct on/off operation upon inputting a differential carrier wave, and a pair of second transistors that are connected to the two pairs of first transistors in series, respectively,
wherein one pair of the two pairs of first transistors input terminals of which are mutually connected are connected to the two first resistors, respectively, and
wherein the pair of second transistors have the pair of input terminals, and the differential input signals are inputted to the pair of input terminals.

8. The transmitter circuit according to claim 1,
further comprising an orthogonal modulator circuit using the two mixers.

9. A transmitter circuit, comprising:
a mixer that conducts frequency conversion of an input signal by using a carrier signal to output a first signal that has been converted in frequency;
a detector that detects a DC offset of the mixers; and an adder that adds a DC voltage that corrects the detected DC offset to the input signal of the mixer, wherein the mixer comprises a double balanced mixer that includes two first resistors for differential output, wherein the transmitter circuit further comprises:

a second resistor that is connected between a node of the two first resistors and a power supply;

a limiter amplifier that amplifies a second signal that appears at the node when potentials of a pair of input terminals that input differential input signals of the double balanced mixer are alternately set to a first potential and a second potential; and a control unit that changes the first potential and the second potential by using a third signal that is outputted by the limiter amplifier, wherein a feedback loop that reduces the amplitude of the second signal by changing the first potential and the second potential, and wherein the first potential and the second potential which are converged in the feedback loop is a potential of the DC voltage which corrects the DC offset.

10. The transmitter circuit according to claim 9, wherein the limiter amplifier comprises a plurality of cascaded inverted amplifiers.

11. The transmitter circuit according to claim 10, wherein a third resistor is connected between an input terminal and an output terminal of an initial inverted amplifier among the plurality of inverted amplifiers.

12. The transmitter circuit according to claim 9, wherein the double balanced mixer includes two pairs of first transistors that conduct on/off operation upon inputting a differential carrier wave, and a pair of second transistors that are connected to the two pairs of first transistors in series, respectively, wherein one pair of the two pairs of first transistors input terminals of which are mutually connected are connected to the two first resistors, respectively, and wherein the pair of second transistors have the pair of input terminals, and the differential input signals are inputted to the pair of input terminals.

\* \* \* \* \*